(12) United States Patent
Kan

(10) Patent No.: US 7,149,717 B1
(45) Date of Patent: Dec. 12, 2006

(54) METHOD AND SYSTEM TO EFFECTUATE MULTIPLE TRANSACTION PRICES FOR A COMMODITY

(76) Inventor: Steven S. Kan, No. 6, Lane 104, Alley 648, Min-Hu Rd., Hsinchu City (TW)

( * ) Notice: Subject to any disclaimer, the term of this patent is extended or adjusted under 35 U.S.C. 154(b) by 1189 days.

(21) Appl. No.: 09/696,206

(22) Filed: Oct. 26, 2000

(51) Int. Cl.
*G06F 17/60* (2006.01)

(52) U.S. Cl. ............................. 705/37; 705/35; 705/36; 705/37; 705/38

(58) Field of Classification Search ................ 705/37, 705/80, 26, 35, 44
See application file for complete search history.

(56) References Cited

U.S. PATENT DOCUMENTS

| | | | | |
|---|---|---|---|---|
| 3,573,747 A | * | 4/1971 | Adams et al. ............... | 705/37 |
| 3,581,072 A | * | 5/1971 | Nymeyer .................... | 705/37 |
| 4,412,287 A | * | 10/1983 | Braddock, III .............. | 705/37 |
| 4,674,044 A | * | 6/1987 | Kalmus et al. .............. | 705/37 |
| 5,077,665 A | * | 12/1991 | Silverman et al. .......... | 705/37 |
| 5,101,353 A | * | 3/1992 | Lupien et al. ............... | 705/37 |
| 5,136,501 A | * | 8/1992 | Silverman et al. .......... | 705/37 |
| 5,794,207 A | * | 8/1998 | Walker et al. ............... | 705/1 |
| 5,802,497 A | * | 9/1998 | Manasse ..................... | 705/27 |
| 5,809,483 A | * | 9/1998 | Broka et al. ................ | 705/37 |
| 5,835,896 A | * | 11/1998 | Fisher et al. ................ | 705/37 |
| 5,873,071 A | * | 2/1999 | Ferstenberg et al. ........ | 705/37 |
| 5,905,975 A | * | 5/1999 | Ausubel ...................... | 705/37 |
| 6,012,046 A | * | 1/2000 | Lupien et al. ............... | 705/37 |
| 6,021,398 A | * | 2/2000 | Ausubel ...................... | 705/37 |
| 6,026,383 A | * | 2/2000 | Ausubel ...................... | 705/37 |
| 6,058,379 A | * | 5/2000 | Odom et al. ................ | 705/37 |
| 6,064,981 A | * | 5/2000 | Barni et al. ................. | 705/26 |
| 6,070,148 A | * | 5/2000 | Mori et al. .................. | 705/26 |
| 6,104,999 A | * | 8/2000 | Gilles et al. ................. | 705/1 |
| 6,141,653 A | * | 10/2000 | Conklin et al. .............. | 705/80 |
| 6,151,589 A | * | 11/2000 | Aggarwal et al. ........... | 705/37 |
| 6,161,099 A | * | 12/2000 | Harrington et al. ......... | 705/37 |

* cited by examiner

*Primary Examiner*—Rich Weisberger
(74) *Attorney, Agent, or Firm*—Bacon & Thomas, PLLC

(57) ABSTRACT

A method and system to effectuate multiple transaction prices for a commodity in a market of many buyers and sellers matches buyers and sellers only when they submit the same prices in their trading requests. The method and system can enhance trading transparency and reduce monitoring and regulation costs by disclosing corresponding transaction types prices, submitted quantities, and matched and unmatched results to buyers and sellers in a spot, securities or futures market through a network computer.

28 Claims, 7 Drawing Sheets

METHOD AND SYSTEM TO EFFECTUATE MULTIPLE TRANSACTION PRICES FOR A COMMODITY

FIELD OF THE INVENTION

The present invention relates to a matching method and system for trading in a market of many buyers and sellers. Particularly, it is directed to effectuating multiple transaction prices for a commodity.

BACKGROUND

A sale consummates at a retail store when a customer accepts the price set by the retailer, for example, grocery at Safeway or merchandise at Sears. Retailers at different locations usually set different prices for the same commodity, for example gas at Shell stations or hamburger at McDonald's. Different prices arise also in retail markets where bargaining over price is permissible. Additionally, volume discount is not uncommon in both retail and wholesale businesses. The mainstream neoclassical economic theory informs that a commodity's value in terms of price is not unique but varies with the circumstances reflecting buyers' demand and a supplier's cost.

The same commodity may still have another price if its sale is conducted through auction. Price of an auction would similarly depend on where and when the auction is held, and who are the bidders. Moreover, different auction rules will result in different prices. In the common English auction ascending bids are heard through oral outcry and the person outbids everyone else wins. In contrast, Dutch auction is conducted in descending price and the one who first cries out wins. The more recent Vickery auction, on the other hand, allows the highest bidder to pay at the price of the second highest bid. Incentive problem and informational asymmetry are the reasons why prices would be different under different auction rules.

Trading in markets of many buyers and sellers has evolved from English auction. In the trading of stocks the early call-through system had an auctioneer who was only a market maker. As it further developed into an open-board system, there emerged specialists who not only performed a market-making role but also made profits by buying and selling out of own accounts. As a result, the listed stocks on NYSE or NASDAQ have a bid price and an ask price. The spread between bid and ask prices is eventually distributed among specialists, brokers, or order routing companies. However, such market of many buyers and sellers has a drawback. Whereas customers in retail sales or auctions would know exactly their transaction prices before deals are reached, a stock investor does not know the resulting transaction price before his/her market order is filled. Furthermore, neither NYSE nor NASDAQ provides real-time public information about the exact transaction prices established by specialists or market makers. The investors would only know from public information the bid and ask quotes, and a commitment from the Securities and Exchange Commission (SEC) to enforce best price principle. The price spread therefore leaves room for misconduct. William Christie and Paul Schultz (1994) raised such a concern when finding that market makers in NASDAQ did not quote in odd-eighths. In response, the SEC launched a full investigation and issued Order Handling Rules in August 1996. NASDAQ's minimum quotation increment was then reduced from ⅛ of a dollar to ¹⁄₁₆.

Recent technological innovations have shown significant impacts on the trading of goods, services, and financial instruments. The Internet connection of geographically dispersed consumers and investors has enabled immense market areas. Many retailers now have web sites to handle orders through electronic catalogs. For instance, Amazon.com becomes a major online retailer in books with the whole world its customer base. Similarly eBay.com enables global auctions by consumers and small businesses. The two examples of e-commerce, however, show a single universal sale price for an item sold. With immense market made possible by Internet technologies, different prices reflecting local demand and supply conditions seem to be at the danger of disappearance. Priceline.com provides, however, an innovative alternative. Using the invention disclosed in U.S. Pat. No. 5,794,207, the web site makes available online a variant of Dutch auction for a buyer to name his/her price. Multiple prices of an airline ticket, for example, that can meet various local demands are therefore brought back to e-commerce.

There have been many technological advances applied to securities market since late 1960s. We do not review here prior art related to quotation dissemination, order routing, trade comparison, or online trading. We instead concentrate on prior art related to matching systems (also known as automated crossing networks).

The use of computers to facilitate stock price negotiation and match between buyers and sellers was first disclosed in U.S. Pat. No. 3,573,747. The Instinet system today pairs buyers with sellers on a time priority basis. For exchange-listed issues orders are executed at the closing price, whereas over-the-counter issues are priced at the midpoint of the inside market. A computation system was disclosed in U.S. Pat. No. 3,581,072. The system accepts limit orders and market orders, and executes all orders where a bid price is at or greater than an offer price. Simulating the open-board stock trading, U.S. Pat. No. 4,412,287 discloses an automated stock exchange where a computer matches buying and selling orders for a variety of stocks and for any size. U.S. Pat. No. 4,674,044 discloses an automated security trading system that provides improved data processing and enables inventory control and profit accounting for market makers. Liquidity to securities markets was considered in an automated system disclosed in U.S. Pat. No. 5,101,353. U.S. Pat. No. 5,136,501 discloses an anonymous matching system that additionally considered credit limits.

As William A. Lupien and John T. Rickard recently state in the detailed description part of their U.S. Pat. No. 6,012,046, "a major problem encountered in the design of crossing networks is that of determining how to match buyers and sellers." The problem, in other words, is how to determine transaction price in matching buyers and sellers. They summarize in their patent description that there are basically three matching rules in crossing networks: the take-out rule that matches overlapping bids and offers at the midpoint of the price spread, the single price auction rule that matches buyers and bidders at a size-weighted average price from overlapping bid and offer prices, and the premium rule "where bids and offers have an associated positive or negative premium, and crossing takes place at the midpoint of market spread or at the minimum necessary premium differential from the midpoint". Taking issues with ad hoc matching rules, they disclose an innovative matching process that maximizes joint satisfaction of all participants.

A careful examination of their maximization algorithm shows, however, that buyers and sellers are still matched at a size-weighted average price. It further shows that their maximizing algorithm is problematic. First, the mutual satisfaction density defined as the multiplicative product of or the minimum between two individuals' satisfaction densities is not meaningful. Consider the case where individuals A, B, C's satisfaction densities for a given price and size are 0.3, 0.4, and 0.5, respectively. Economists have long elucidated that individual's utility, satisfaction density as used by Lupien and Rickard, is only ordinal in nature and cannot be interpersonally compared. There is no way to infer that C's satisfaction is greater than B's, B's greater than A's, or C's greater than A's. Therefore, it's not true that the mutual satisfaction density of 0.15 (or 0.3 by their minimum definition) between A and C indicates a higher mutual satisfaction than that of 0.12 (or 0.3) between A and B. Second, it's equally meaningless to add mutual satisfaction densities of all participants and seek optimal allocations of amounts and prices through their mathematical algorithm. The reason is again that utilities or satisfaction densities cannot be added across different persons as cardinal numbers. Third, the link between the computed average price and a trader's submitted prices is weak. The mutual satisfaction between a particular buyer and a particular seller can be very low even when all participants' joint mutual satisfaction is maximized. When that happens the algorithm will in effect mismatch two parties and very likely at a computed average price that neither party has indicated in his/her satisfaction profile. In addition, though the algorithm can effectuate multiple transaction prices for a stock, the price distribution is not disclosed. These problems pose threat to traders' interests in that a better match would be lost and that it will be very difficult to ascertain whether there is computation error or misconduct in the matching process.

Recent emergence of e-marketplace or digital exchange through Internet suggests that there will be more application of Internet technologies to the trading between many buyers and sellers. Web sites such as e-Steel, CATEX, Chemdex, e-chemicals, CreditTrade, and OracleExchange are serving trading demand in various industries. These sites typically have extensive electronic product catalogs and adopt traditional auction rules. On the other hand, Lupien is partnering with a digital exchange, ShipDesk, to use his newly patented trading rule.

Yet, industry demand for the growing e-marketplace or digital exchange is not fully met by existing trading rules. It is worthwhile stressing again that the value of a commodity is uncertain, just like that of a stock. Demand fluctuations and temporary disruptions of supply are usual causes for the uncertainty. News of technological breakthrough and change in business strategies are additional causes in this era of constant change. Users, suppliers or wholesalers would have different appraisal of all these factors. The information of these value appraisals, however, is not available. A reason, as mentioned earlier, is that most trading rules only effectuate a transaction price. Another reason is that multiple transaction prices, even effectuated in some way, are not disclosed to the public. Both present problems to business management, inventory management, capacity management and risk management.

One issue related to inventory is how to account for its value and manage a proper level of inventory. Traditionally, there are first-in-first-out (FIFO) and last-in-first-out (LIFO) methods for inventory value accounting, as inventory is accumulated over time. A new way to reduce inventory cost is just-in-time production and it shows tremendous success in various industries. Yet, there is capacity management problem regarding production to order. For both cases a market effectuating multiple transaction prices of a commodity at any given time can offer additional advantage.

With a price distribution of a commodity, as represented by multiple transaction prices and corresponding volumes, inventory stock becomes essentially a portfolio consisting the same commodity of high and low prices. Inventory management can therefore be conducted by value rather than time, just as the management of a portfolio of equity stocks. Similarly, adjustment of just-in-time production orders or manufacturing capacity can be better managed with information of the commodity's price distribution. It is clear as well that wholesalers need to conduct similar inventory and order management. The information of price distribution can help more efficient operations.

It should also be mentioned that financial people have long recognized the uncertainty of asset value and its associated risks. Mutual fund managers use stock portfolio to diversity risk. Market makers in stock exchanges or OTC manage a given stock of several different prices, a price portfolio as we call it below. A trading method and system that can effectuate multiple transaction prices and disclose the price distribution therefore will not only extend market's function into the discovery of a price distribution, but also enable price portfolio management in financial sector as well as manufacturing and distribution sectors.

Finally, it is worth noting that the regulation of stock exchange or OTC trading is very costly. There is cost associated with the operation of a self-regulatory body. There is also cost associated with government regulation. A primary reason for the regulation is that price spread leaves room for misconduct. Were trading rules not improved, the growing number of e-marketplaces or digital exchanges would mean that regulation cost must grow proportionally to maintain orderly markets for the new economy. There would be additional cost to individuals as well, because they need to spend more time monitoring prices in various virtual markets. The cost would be far more than proportional because time cost does not exhibit constant or decreasing feature. A need is therefore to reduce monitoring and regulation costs of digital exchanges in the Internet age.

In summary, the above review shows that there still are trading problems to be solved.

1. The spread between bid and offer prices in established stock exchanges and OTC leaves room for misconduct.
2. Crossing networks' matching rules set a transaction price in ad hoc fashions.
3. The latest related patent by Lupien and Rikard, though claimed to maximize joint satisfaction, is problematic and does not empower traders with full price transparency.
4. Investors, while can manage a portfolio of stocks to diversify risks, currently have no way to purchase or sell, at a point in time, a portfolio of a given stock with different prices and quantities. The problem is acute because the uncertainty of a stock's value cannot be directly observed and can only be inferred from daily price fluctuation. As a result, investors' rush into buying or selling when market condition changes has become a source of market volatility.
5. The growing number of e-marketplaces or digital exchanges means that horrendous regulation cost would be incurred in maintaining orderly markets in a new economy, were there no improvement on trading art.

Therefore, an object of the present invention is to effectuate multiple transaction prices for a commodity in a market of many buyers and sellers.

Another object of the present invention is to enable direct observation of a commodity's transaction price distribution.

An additional object of the present invention is to enforce transaction prices to be always equal to the common prices submitted by both buyers and sellers for a commodity.

SUMMARY OF THE INVENTION

The present invention provides a method and system to effectuate multiple transaction prices for a commodity. The method and system is suitable for a market of many buyers and sellers and for the trading of broadly defined commodities including goods, services, and financial instruments. The system disclosed involves a preferred embodiment using communications network to implement the method. The method is entirely unconventional in that no competitive bidding is involved. As such, there is no bid-and-ask price spread. The present invention ensures full price transparency by effectuating transaction prices to be always equal to the common prices submitted by both buyers and sellers. The invention also enables direct observation of a commodity's price distribution as well as distributions of market indices.

To utilize the present invention, an exchange operator predetermines sets of price numbers, commodity symbols, and matching priority parameters. A remote trader must submit in each trading request trading information such as a commodity symbol, an indication of buy or sell, and the associated quantity as well as price. A plurality of matching priority parameters is optional. A remote trader can freely enter his/her desired quantity in a trading request; however, he/she must select commodity symbol, price number, and matching priority parameters, if any, from the sets predetermined by the exchange operator. A remote trader can submit a packet of trading requests containing several buys and/or sells. The remote trader can also indicate different price numbers for a commodity to be bought and/or sold.

The system implementing the new matching method comprises at least an exchange server (ES) that includes input/output devices such as a network interface card, processing devices such as a central processing unit, and storage devices such as a hard disk for storing software programs and databases.

The software program executing the new method is essentially composed of a request submission module (RSM), a pairing and matching module (PMM), and an information disclosure module (IDM). The RSM provides, through user interface, a trading form for a remote trader to input a packet of trading requests. After receiving a packet of trading requests, the RSM verifies if the submitted price numbers, commodity symbols, and matching priority parameters are in conformance to the predetermined sets, respectively.

Being verified, a trading request becomes a pairing element and is forwarded to a matching table according to the price number and commodity symbol indicated. A matching table therefore would only gather pairing elements of same price number and commodity symbol. On each matching table, the PMM separates pairing elements into buying and selling sides. Each side's total submitted quantity is then obtained. The PMM identifies the side of a smaller sum as the short side, conversely a long side. This completes the pairing process.

In the matching process, no pairing element of the short side will be left unmatched. A series of matching steps are involved for the PMM to determine which long side pairing element is matched to which short side pairing element, and what are the matched and unmatched amounts. Essentially, the matching process requires the PMM to identify the matching priority parameter indicated in the short side's pairing element. If request submission time is identified to be the matching priority parameter, the PMM then searches the long side for the pairing element that shows the earliest request submission time, and matches it with the original pairing element of the short side. The PMM iterates the steps until the original pairing element's unmatched quantity reaches zero or falls below the minimum lot size. The PMM then selects the next pairing element of the short side to perform another match. The PMM allows matching priority parameters other than request submission time. In this case, a match will require the PMM to search for account profile database. A pairing element of the long side will be matched only if the remote trader's account profile contains the matching priority parameter indicated in the original pairing element of the short side. The PMM also allows the indication of more than a matching priority parameter in a trading request.

The IDM serves to transmit trading information to remote traders. Trading information can be transmitted automatically or after an inquiry is received. Three kinds of trading information are provided. The first kind is related to a remote trader's trading information; it is limited to the remote trader only. The second kind is related to the trading information of a particular commodity or price market. The third kind is related to the trading information of a group of commodities or the aggregate market. Trading information is provided to remote traders in tabular data or charts. The charts enable direct observation of a commodity's price distribution as well as distributions of market indices. The present invention therefore extends market's function into the discovery of price distribution and enables price portfolio management by people in financial, manufacturing, and distribution sectors.

DETAILED DESCRIPTION

The present invention relates to a method to effectuate multiple transaction prices for commodity trading and the system thereof using communications and computer network. A detailed description is provided below to indicate what the method and system essentially involve.

Figure 1:
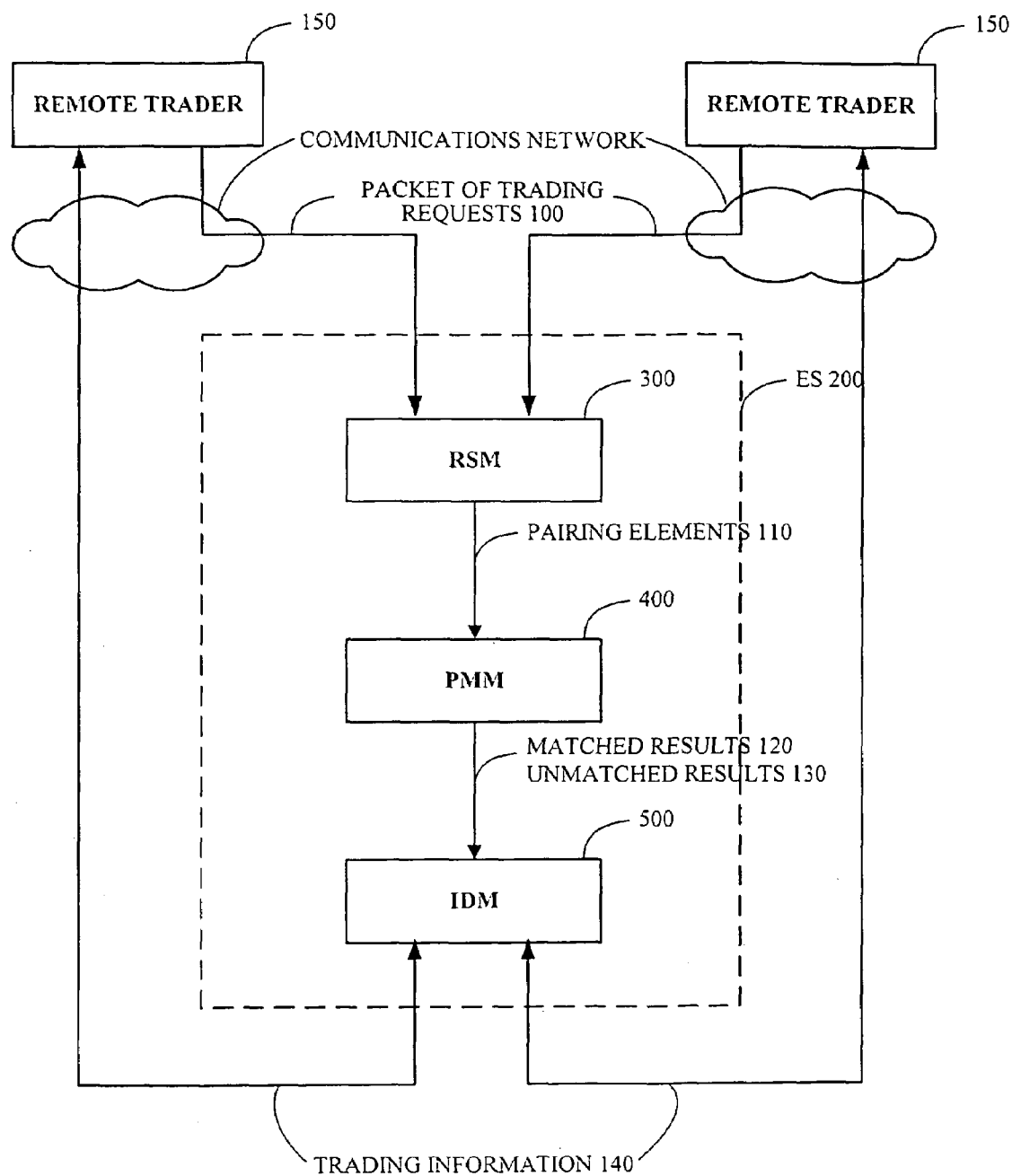
FIG. 1 is a block diagram showing the present invention in a communications network.

A remote trader 150 submits a packet of trading requests or an inquiry of trading information via a communications network to the ES 200, as shown in FIG. 1. After receiving the submitted request or inquiry, the ES 200 will respond automatically and start corresponding processing steps.

There can be many remote traders, though only two are shown in FIG. 1. Remote traders may use a personal computer and a modem, for example, to access a communications network. Other means for remote traders to access a communications network are possible, for instance, a computer with a network card and a router, or a wireless handset with WAP capability. By communications network it is meant to include World Wide Web (WWW), Wireless Application Protocol (WAP), Internet, Local Area Network (LAN), and Proprietary Network, etc.

Before submitting the first request, a user must obtain in advance his/her user privilege from an exchange. In establishing a user account, a potential remote trader needs to supply several pieces of necessary information. So it is assumed here. The ES 200 stores user account profiles in the account profile database 272. A remote trader may be an individual, an agent of an institution, or broker/dealer engaging in the trading of commodities. A remote trader's account profile in the database may include the trader's name, personal or corporate identification number, e-mail address, preferred settlement agency, payment account, and identification and security password assigned by the ES 200, etc.

Figure 2:
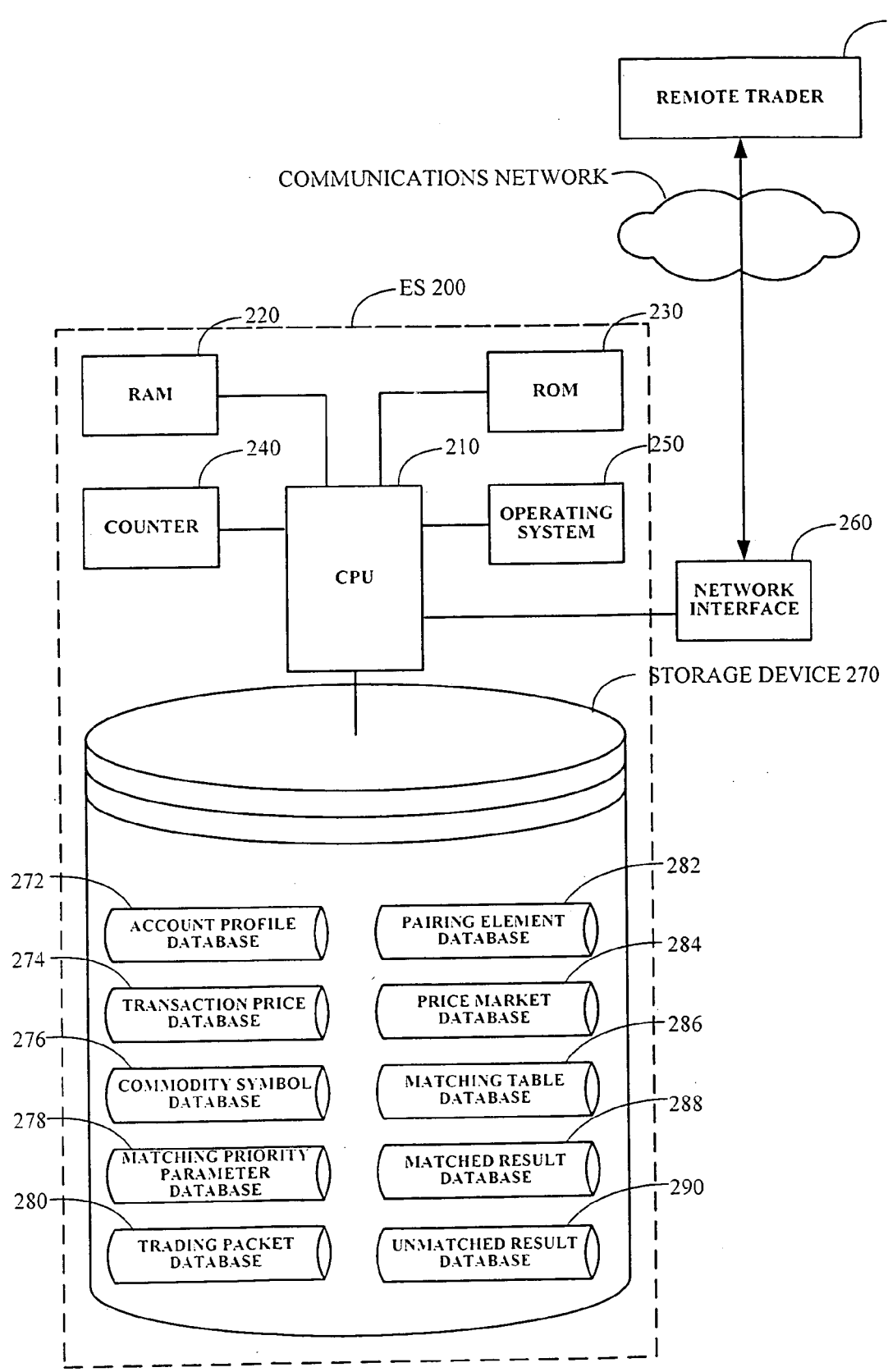
FIG. 2 shows the block diagram of the ES and database.

As shown in FIG. 2, the ES 200 comprises an input/output devices, processing devices, and storage devices. The input/output device comprises at least one network interface 260. The processing device includes at least one central processing unit 210, a random access memory 220, a read only memory 230, a counter 240, an operating system 250, etc. The storage device 270 stores the programs and databases necessary to execute this invention's new trading method. The databases include at least an account profile database 272, a transaction price database 274, a commodity symbol database 276, a matching priority parameter database 278, a trading packet database 280, a pairing element database 282, a price market database 284, a matching table database 286, a matched result database 288, and an unmatched result database 290.

The account profile database 272 is the aforesaid database containing account profiles. The transaction price database 274 stores the predetermined price numbers set by the exchange operator. For clarity, we use $p_1, p_2, \ldots, p_n$ to represent the predetermined price numbers. The remote trader 150's submitted prices must belong to the set of $\{p_1, p_2, \ldots, p_n\}$. Similarly, the commodity symbol database 276 stores the predetermined commodity symbols set by the exchange operator. These commodity symbols are denoted by $x_1, x_2, \ldots, x_m$. The remote trader 150 must also select from the predetermined set $\{x_1, x_2, \ldots, x_m\}$ to indicate in his/her trading requests the commodities to be traded. The matching priority parameter database 278 comprises predetermined parameters to be selected by remote traders. The predetermined set of matching parameters may include, but not limited to, the request submission time, the trading volume, settlement agency, warehouse for delivery, and the physical distance between the remote trader 150 and the exchange.

The ES 200 performs three primary operations. The RSM 300 deals with the submission of trading requests. The PMM 400 performs matching steps. And the IDM 500 handles information disclosure.

A function of the RSM 300 is to provide a trading request form such that the remote trader 150 can enter and submit a packet of trading requests 100. Another function of the RSM is to generate pairing elements 110 from the submitted trading packet, and send them to the PMM 400. The PMM 400 pairs and matches the pairing elements 110 to obtain matched results 120 and unmatched results 130. The IDM 500 serves to display information about the remote trader 150's trading requests, matched results 120, and unmatched results 130. It also provides latest trading information in each matching table and statistical indices aggregating transaction information of all commodities traded. Above trading information can be displayed in tabular data or chart.

Figure 3:
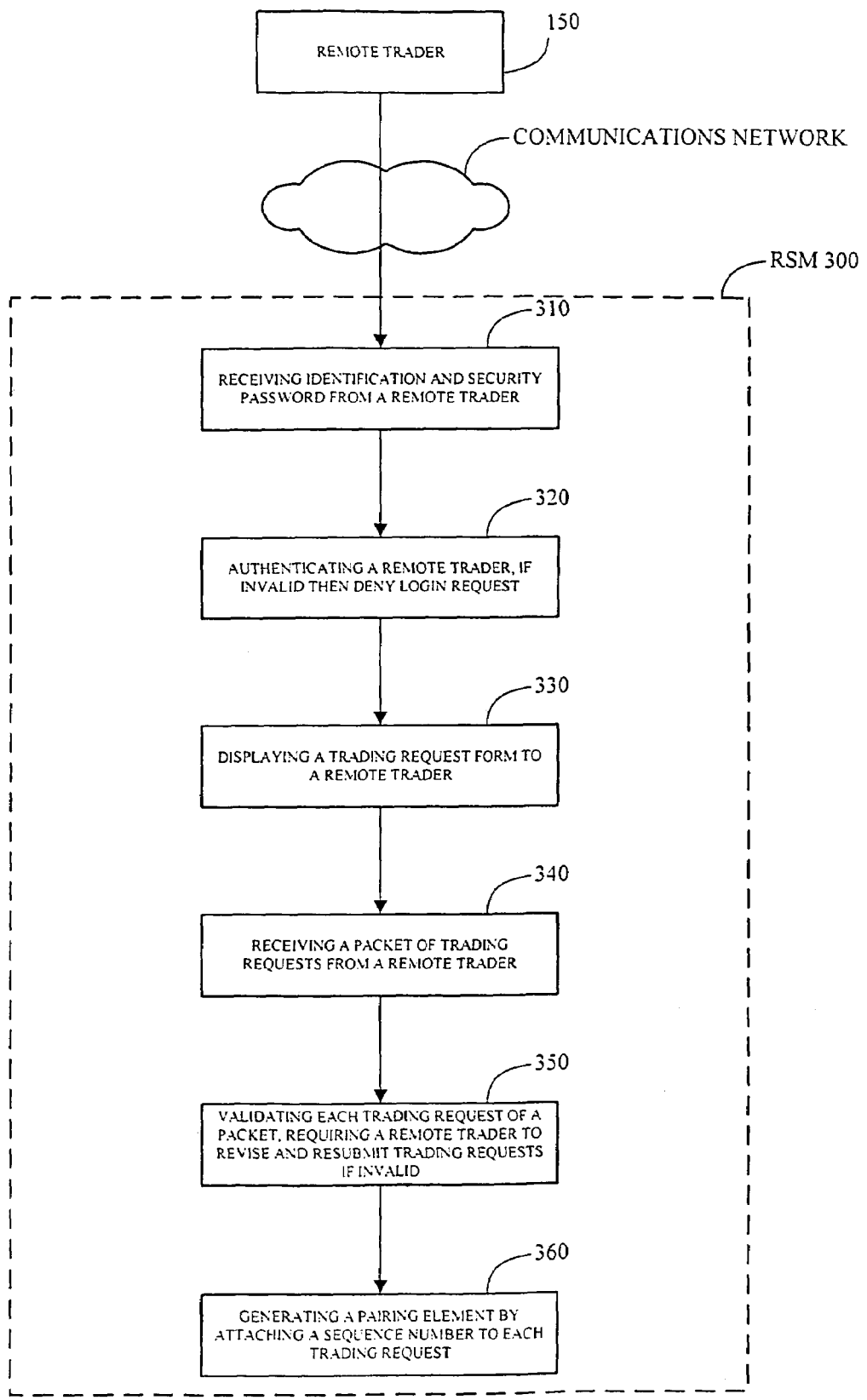
FIG. 3 is a flowchart of the RSM.

FIG. 3 shows the flowchart of the RSM 300. In step 310 the remote trader 150 registers into the RSM 300 through a communications network and by keying in his/her ID and password. After receiving these data, the RSM 300 will verify if they are valid in step 320. If invalid, the login request is denied. If valid, the RSM 300 displays a trading request form for the remote trader 150 to input a packet of trading requests 100 in step 330.

The columns of a trading request form may include, but not limited to, commodity symbol, submitted price, submitted quantity, matching priority parameter, etc. The remote trader 150 can input a plurality of trading requests and send them as a packet. Table 1 shows, for example, a packet of trading requests. The remote trader, identified as $R_0$, enters five trading requests, with submitted prices of 75, 55, 35, 40 and 80, respectively. The corresponding commodity symbols selected are $x_3, x_1, x_5$ and $x_2$, where $x_5$ is for both a buy and a sell. Also shown in the table is $R_0$'s entry of matching priority parameters. $R_0$ selects request submission time as his/her matching priority parameter for the trading of $x_3, x_1$, and $x_2$. For $x_5$, $R_0$ chooses to use settlement agency $k_2$ as the matching priority. The price numbers, commodity symbols, and matching parameters are all selected from the corresponding predetermined sets, respectively. The system automatically supplies the date, time, and the tracking number.

TABLE 1

A PACKET OF TRADING REQUESTS
IDENTIFICATION: $R_0$
DATE: Sep. 18, 2001
TIME: AM 09:30
TRACKING NUMBER: 10022561

| COMMODITY SYMBOL | BUYING OR SELLING | SUBMITTED PRICE | SUBMITTED QUANTITY | MATCHING PRIORITY PARAMETER |
|---|---|---|---|---|
| $X_3$ | Selling | 75 | 40 | Request Submission Time |
| $X_1$ | Buying | 55 | 20 | Request Submission Time |
| $X_5$ | Buying | 35 | 10 | Settlement Agency $k_2$ |
| $X_5$ | Selling | 40 | 10 | Settlement Agency $k_2$ |
| $X_2$ | Selling | 80 | 15 | Request Submission Time |

After receiving the packet of trading requests 100 from $R_0$, the RSM 300 verifies in step 350 the validity of trading requests submission. The validity check is aimed at assuring that price numbers, commodity symbols, and matching priority parameters are indeed, respectively, in conformance to the predetermined sets. This step can be omitted when above trading information is selected from a scroll-down button. It also aims at checking whether each trading request contains all necessary information. In this sense, the step cannot be omitted. If invalid, the RSM 300 will ask a remote trader to revise and resubmit his/her trading requests. If valid, the RSM 300 will store them in the trading requests database 280.

The RSM then generates a pairing element 110 by attaching a sequence number to a trading request. For $R_0$'s packet of five trading requests in the above example, five pairing elements are generated in the step. The pairing elements are then stored in the pairing element database 282. The RSM also forwards the pairing elements to the PMM for further process.

Matching is conducted in price markets and on matching tables. Price markets are established according to the price numbers in the transaction price database 274. Therefore, there are n price markets. In each price market matching tables are further established according to the predetermined commodity symbols of the commodity symbol database 276. In each price market there are therefore m matching tables. As such there is a matrix of n×m matching tables on which matching takes place. We denote below a pair $(p_i, x_j)$, where $i \in \{1,2, \ldots n\}$ and $j \in \{1,2, \ldots m\}$, to represent the matching table on which trading requests of $p_i$ and commodity symbol $x_j$ are waiting to be processed.

Figure 4:
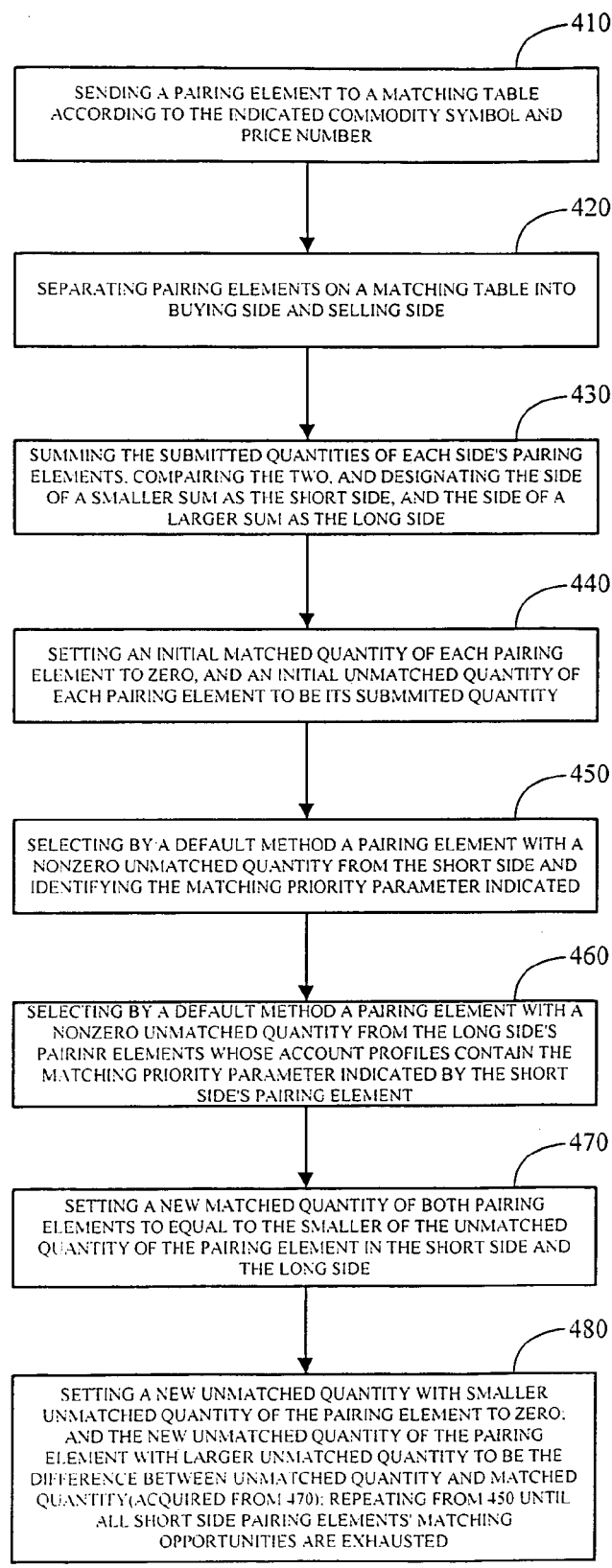
FIG. 4 is a flowchart of the PMM.

FIG. 4 shows the flowchart of the PMM 400. In step 410 the PMM 400 sends the pairing elements 110 to corresponding matching tables. Pairing elements are first sent to respective price market according to the price number indicated. In each price market pairing elements are further sent to different matching tables according to the commodity symbols indicated. These data are stored in the matching table database 286. As a result, all pairing elements with same commodity symbol and price number are gathered on a matching table. For example, all pairing elements 110 with the same submitted price of $p_i$ and commodity symbol of $x_j$ are gathered in the matching table $(p_i, x_j)$.

In step 420, the PMM 400 separates pairing elements on a matching table into two sides, the buying side whose pairing elements indicate a buy and the selling side whose pairing elements indicates a sell. The PMM then in step 430 sums the total submitted quantity of each side, compares them, and designates the side with a smaller sum as the short side. Conversely, the side with a larger sum is designated as the long side. This completes the pairing process.

It's clear that the maximum volume of matched transactions cannot exceed the short side's total submitted quantity. In other words, pairing element of the short side can all be matched. Only the long side will show unmatched pairing elements. Which pairing elements of the long side will be matched and which won't depends on the matching priority parameter indicated. For the present invention, the ES 200 predetermines a plurality of matching priority parameters for remote users to select. The system's default matching priority is based on the request submission time, when a trading request does not indicate any matching priority.

The PMM is now ready to start the matching process. On each matching table the PMM sets in step 440 the initial matched quantity of each pairing element to be zero. The same step sets the initial unmatched quantity to be the submitted quantity.

In step 450 the PMM reads in a pairing element from the short side. As an illustration, we assume that the pairing element indicates request submission time to be the matching priority parameter. Complying the priority indication, in step 460 the PMM searches unmatched pairing elements of the long side. The PMM then finds the pairing element that has the earliest request submission time and matches it with the original pairing element of the short side. More generally, a trading request may indicate a matching priority parameter other than the request submission time. As our earlier example shows in Table 1, $R_0$ prefers matching with someone who uses settlement agency $k_2$ for the trading of $x_5$. To match $R_0$'s short side pairing element, the PMM searches in step 460 for unmatched pairing elements of the long side. The PMM needs also search the account profile database to find a subset of these long-side pairing elements whose traders have indicated $k_2$ in their account profiles. The particular pairing element to be matched can then be selected randomly or by request submission time from the subset. There also can be several criteria for selecting a pairing element from the short side in step 450. For instance, the selection can be based on the request submission time or random drawing. In order not to complicate our illustration, the details of steps 450 and 460 are omitted in FIG. 3.

After two pairing elements are matched by the method disclosed above, the PMM sets in step 470 a new value for the matched quantity. It is equal to the smaller value of the original unmatched quantity of the two pairing elements. The PMM also sets in step 480 new values of unmatched quantity for the two pairing elements. They are equal to the difference between the original unmatched quantity and the new matched quantity, respectively. The PMM then stores information of the matched result 120 in the matched result database 288, and the unmatched result 130 in the unmatched result database 290. Information contained in these databases comprises those associated with the pairing elements, the traders' profile, the transaction time and date, the effectuated transaction prices, and the matched or unmatched quantities. The matching process iterates until matching possibility of the short side's pairing element is all exhausted. It occurs when the new unmatched quantity reaches zero. We also note here that the description of the matching process is based on the assumption of no minimum lot size for a transaction. The PMM can certainly accommodate a minimum lot size in a simple way.

The following illustration will further disclose how the PMM proceeds matching pairing elements when a second matching priority is allowed. Table 2 shows, for example, pairing elements on a matching table and the associated relevant information. Since the price number and the commodity symbol of pairing elements on a matching table are the same, they are omitted from Table 2 for simplicity. Table 2 shows that a trader can indicate his/her first matching priority and second matching priority. For example, remote traders $R_2$ and $R_4$ indicate their first matching priority to be $A_1$ and second priority to be $A_2$. $R_3$, on the other hand, indicates $A_2$ to be the first priority, and $A_1$ the second priority. $R_1$, however, shows only the first priority $A_2$. $R_5$ does not indicate any matching priority at all. As described earlier, the system uses request submission time as the default matching priority when a remote trader dose not indicate any. It's also noted that some matching priority parameters are also a piece of information in the account profile. In this example, $A_1$ and $A_2$ represent two different settlement agencies, and they are part of $R_1$, $R_2$, $R_3$, and $R_4$'s account profiles stored in the account profile database 272. In the case that there is no central clearing house and settlement agencies are not directly connected, it is natural to assume that a remote trader would like to be matched with one employing the same settlement agency to save settlement cost. We make this assumption in Table 2.

TABLE 2

PAIRING ELEMENTS ALLOWING A SECOND MATCHING PRIORITY

| REMOTE TRADER | BUYING OR SELLING | SUBMITTED QUANTITY | FIRST PRIORITY | SECOND PRIORITY | SETTLEMENT AGENT IN ACCOUNT PROFILE | REQUEST SUBMISSION TIME |
|---|---|---|---|---|---|---|
| $R_1$ | Buy  | 10 | $A_2$ |       | $A_2$ | 10:00 |
| $R_2$ | Sell | 20 | $A_1$ | $A_2$ | $A_1$ | 09:30 |
| $R_3$ | Sell |  5 | $A_2$ | $A_1$ | $A_2$ | 08:30 |
| $R_4$ | Buy  | 15 | $A_1$ | $A_2$ | $A_1$ | 08:00 |
| $R_5$ | Sell | 40 |       |       | $A_1$ | 09:00 |

From steps 420 and 430, the PMM identifies the buying side as the short side, with a total submitted unmatched quantity of 25. The selling side is the long side, with a total unmatched quantity of 65. As described earlier, the short side determines the total number of matched quantity. In this case, the matching table will have a total matched quantity of 25. The matching job is to determine which seller is matched with which buyer and by what amount. Since the buying side is the short side, the matching priority parameters indicated by sellers become irrelevant. Whether a seller has in his/her account profile the matching priority parameter indicated by a buyer will determine the matching result.

Step 440 sets each paring element's initial match quantities to be zero and unmatched quantity to be the submitted quantity. As also described earlier, the first buyer to be matched can be selected by random drawing or by request submission time. Here we continue the illustration by using request submission time. Step 450 therefore identifies $R_4$ to be the first buyer to be matched. In step 460, the PMM identifies $R_4$'s first matching priority as $A_1$. A search of sellers' account profiles will show that $R_2$ and $R_5$ employ settlement agency $A_1$. Between the two matching candidates, it is assumed that the PMM uses request submission time to match $R_5$ with $R_4$. Step 470 sets the new matched quantity to 15 for both $R_5$ and $R_4$. In step 480, the PMM sets $R_4$'s new unmatched quantity to 0, and $R_5$'s new unmatched quantity to 25.

The PMM then returns to step 450 to select another buyer. So $R_1$ is selected. Going through the same steps, the PMM matches $R_3$ with $R_1$ because the former employs $A_2$ that is indicated as the latter's first matching priority. The matched quantity is 5 and $R_3$ leaves nothing to be matched, while $R_1$ has a new unmatched quantity of 5. The PMM again returns to step 450. Since no remaining unmatched seller shows $A_2$ in account profiles, the PMM uses request submission time to match $R_5$ with $R_1$. As a result of the match, $R_1$'s unmatched quantity becomes zero and $R_5$'s unmatched quantity and matched both become 20. The matching result of this example is summarized in Table 3.

TABLE 3

THE MATCHING RESULTS OF TABLE 2

| BUYER | UNMATCHED QUANTITY | MATCHED QUANTITY | SELLER | MATCHED QUANTITY | UNMATCHED QUANTITY |
|---|---|---|---|---|---|
| $R_4$ | 0 | 15 | $R_5$ | 15 | 20 |
| $R_1$ | 0 | 10 | $R_5$ | 5 | 0 |
|       |   |    | $R_3$ | 5 | 0 |
|       |   |    | $R_2$ | 0 | 20 |
| Total on the Matching Table | | | | 25 | 40 |

Figure 5:
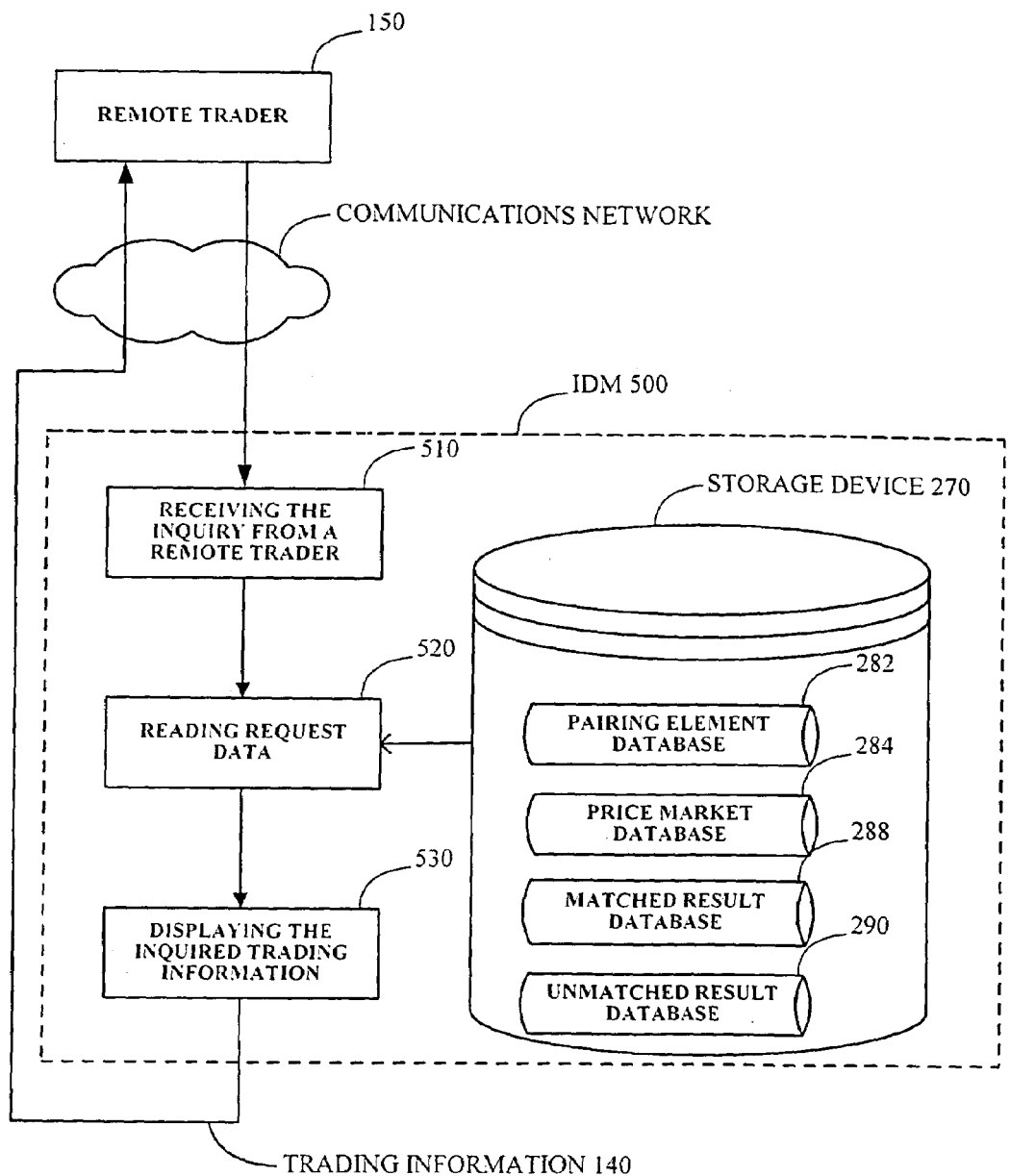
FIG. 5 is a flowchart of the IDM.

The IDM 500 serves to transmit trading information 140 to a remote trader 150. The trading information 140 includes at least three kinds of information. The first kind is related to a remote trader's trading information only. The second is related to information about a price market or a commodity. The third is related to aggregate trading statistics or indices. The above information received by remote traders is displayed in tabular data and/or charts. FIG. 5 gives a flowchart of the IDM 500.

Information about a trader's trading requests and matching results is limited to the trader only. The information can be automatically sent by the system to a remote trader's pc monitor, or other display device, for example, a mobile phone. A remote trader can also log on to ES and inquire about such information. After receiving the inquiry, the IDM 500 will read from the pairing element database 282, the matched result database 288, or the unmatched result database 290 to respond to the inquiry. An example of the IDM's response to an inquiry of trading record is shown in Table 4. The trading record is in tabular data and shows the remote trader $R_0$'s trading results between the market opening time and 11:43 am, Sep. 18, 2001.

TABLE 4

A TRADING RECORD RESPONDING TO A TRADER'S INQUIRY
IDENTIFICATION: $R_0$
DATE: Sep. 18, 2001
TIME: AM 11:43

| COMMODITY SYMBOL | BUYING OR SELLING | SUBMITTED PRICE | SUBMITTED QUANTITY | MATCHED QUANTITY | UNMATCHED QUANTITY |
|---|---|---|---|---|---|
| $X_3$ | Selling | 75 | 40 | 30 | 10 |
| $X_1$ | Buying | 55 | 20 | 10 | 10 |
| $X_5$ | Buying | 35 | 10 | 0 | 10 |
| $X_5$ | Selling | 40 | 10 | 10 | 0 |
| $X_2$ | Selling | 80 | 15 | 0 | 15 |

Figure 6:
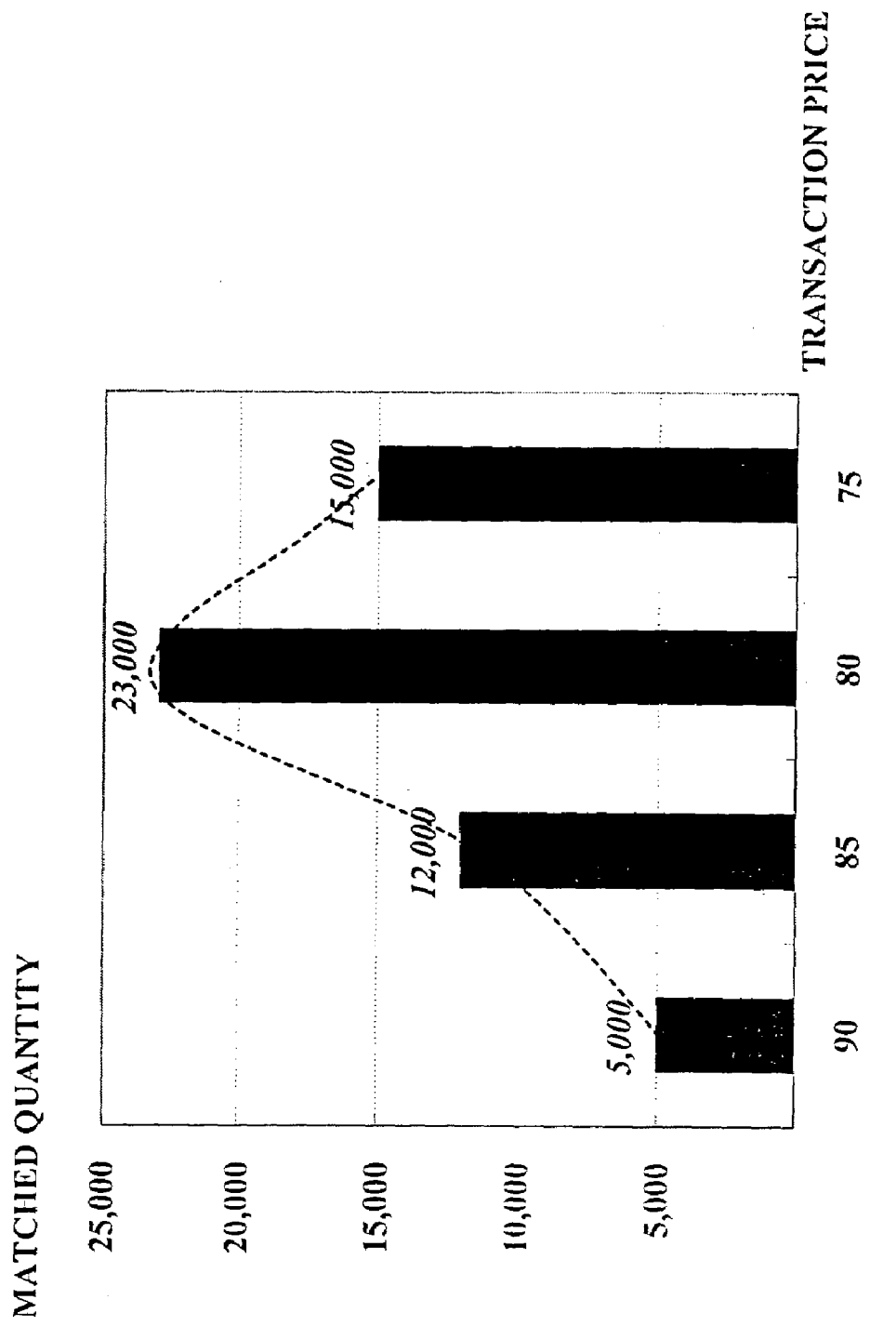
FIG. 6 shows the price distribution of effectuated multiple transaction prices in a bar chart.

A remote trader 150 can inquire the latest trading information about a commodity. The trader can simply input from user interface the commodity symbol and submit the inquiry. After receiving the inquiry, the IDM searches for the matched result database 288 and the unmatched result database 290, and reports the commodity's latest matched and unmatched records. Table 5 shows an example of the latest market prices of commodity $x_2$ at AM 9:36, Sep. 20, 2001. The table discloses that four transaction prices, 90, 85, 80 and 75 have been effectuated for the commodity $x_2$. It also shows the matched quantity of $x_2$ at respective transaction price. Information of unmatched quantity for buying side and selling side is also disclosed. The matching result of Table 5 can also be displayed as a bar chart. The bar chart, as shown in FIG. 6, enables direct observation of the price distribution of commodity $x_2$.

A remote trader may be more interested in price then commodity per se. This occurs when a remote trader has a tight budget constraint or a specific sales target. Imaginably a trader in the business of resale for profits would want to know what commodities are available at a specific price. The remote trader can then inquire trading information in a price market by inputting the interested price number. After receiving the price number, the IDM searches the price market database 284, the matched result database 288, and the unmatched result database 290 to find corresponding information. Table 6 shows an example of the latest trading information in the price market denoted by 95. The table shows that, at 10:06 am, Sep. 20, 2001, four commodities $x_2$, $x_4$, $x_5$ and $x_8$ are traded at a price of 95. It also shows matched and unmatched quantities of the four commodities.

Statistics and indices providing trading information of a group of commodities or the aggregate market are very useful to remote traders in general. Such data or charts enable remote traders a feel of the general market sentiments and the correlations between different groups of commodities. The IDM sends above information through communications network to remote traders' terminal monitors or other display devices. The IDM can also respond to remote traders' inquiries of such trading information. A typical

TABLE 5

TRADING INFORMATION-by COMMODITY
COMMODITY: $X_2$
DATE: Sep. 20, 2001
TIME: AM 09:36

Figure 7:
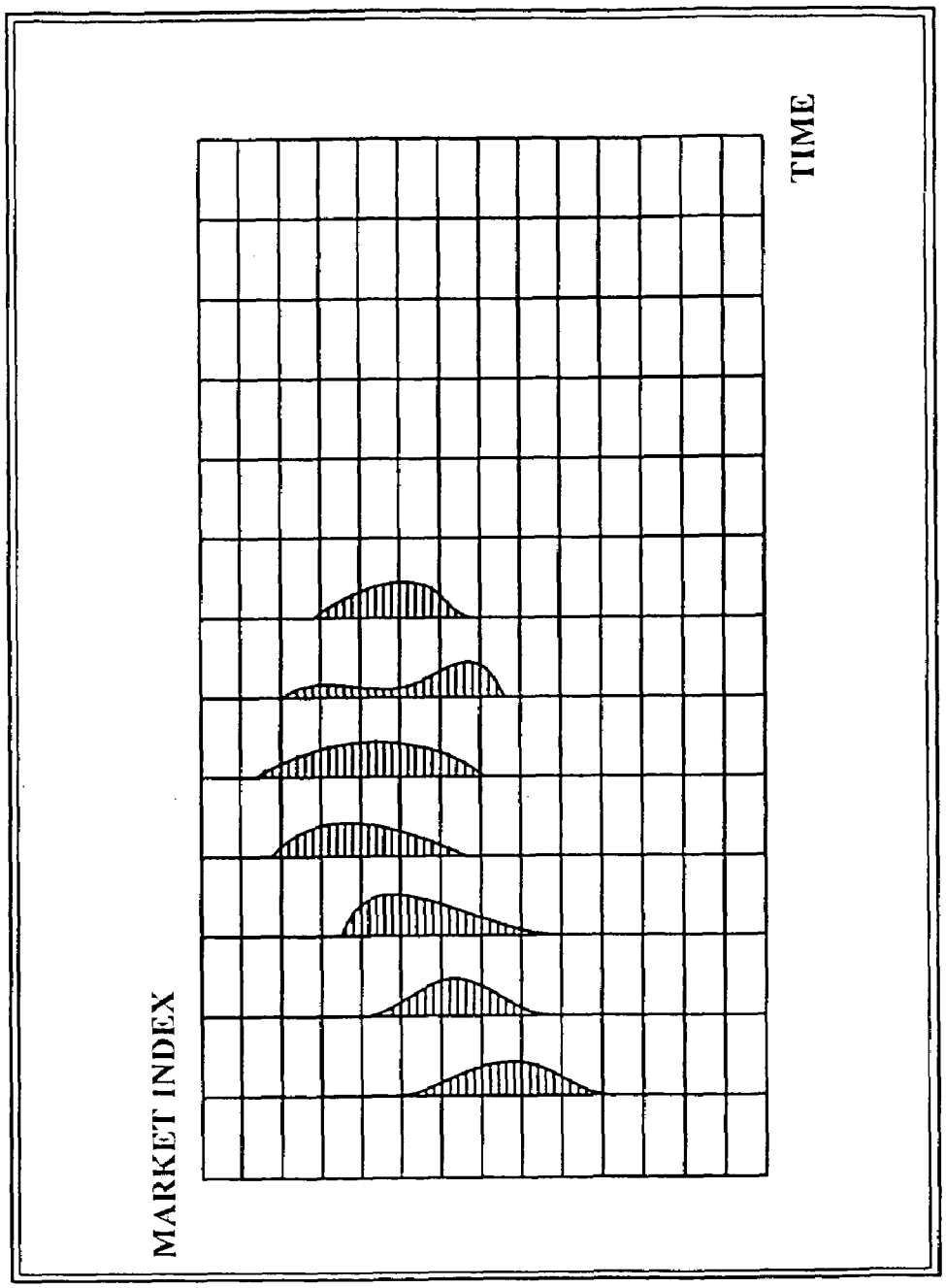
FIG. 7 shows the distribution of a market index.

| TRANSACTION PRICE | SUBMITTED QUANTITY (BUY) | SUBMITTED QUANTITY (SELL) | MATCHED QUANTITY | UNMATCHED QUANTITY BUY | UNMATCHED QUANTITY SELL |
|---|---|---|---|---|---|
| 90 | 6,000 | 5,000 | 5,000 | 1,000 | 0 |
| 85 | 18,000 | 12,000 | 12,000 | 6,000 | 0 |
| 80 | 23,000 | 26,000 | 23,000 | 0 | 3,000 |
| 75 | 15,000 | 18,000 | 15,000 | 3,000 | 0 | piece of information of NYSE or NASDAQ is a time plot showing the values of a market index during a day. The IDM of the present invention, on the other hand, can additionally provide a distribution of a market index, as shown in FIG. 7, for an enriched feel of general market sentiments. By effectuating multiple transaction prices and displaying them in tabular data or charts, the invention extends market's function into the discovery of price distribution.

TABLE 6

TRADING INFORMATION-by PRICE
PRICE: 95
DATE: Sep. 20, 2001
TIME: AM 10:06

| COMMODITY SYMBOL | SUBMITTED QUANTITY (BUY) | SUBMITTED QUANTITY (SELL) | MATCHED QUANTITY | UNMATCHED QUANTITY BUY | UNMATCHED QUANTITY SELL |
|---|---|---|---|---|---|
| $X_2$ | 24,000 | 33,000 | 24,000 |  | 9. |
| $X_4$ | 9,000 | 11,000 | 9,000 |  | 2. |
| $X_5$ | 8,000 | 3,000 | 3,000 | 5. |  |
| $X_8$ | 14,000 | 11,000 | 11,000 | 3. |  |

From the above detailed description, those skilled in the trading art can easily grasp the salient features of the present invention. Anyone who skills in communications and computer network technology can also easily implement the system and steps disclosed above. A current exchange operator can also apply the method and system disclosed as an additional way of trading. Provision of the method and system for after-hour trading, extended trading, or side by side with any existing trading method and system can broaden market participants' choice space and increase market transactions. One who is acquainted with the present invention will soon come to realize that it can be applied to the trading of goods and services, stocks, bonds, currencies, futures, options, warrants, insurance contracts, and other financial instruments and their derivatives.

Having described and illustrated the principles of the present invention with reference to a preferred embodiment, it will be apparent that the invention can be adapted or modified in arrangement and detail without departing from such principles. As such, it should be recognized that the detailed description is illustrative only and should not be taken as limiting the scope of the present invention, and spirit of the following claims and equivalents thereto:

The invention claimed is:

1. A method to effectuate multiple transaction prices for a commodity, which is carried out by an exchange server, wherein transaction prices are always equal to common prices submitted by both buyers and sellers, comprising the steps of:

(A) receiving a packet of trading requests that comprises at least one trading request, wherein a remote trader who is a buyer or seller, can optionally indicated a plurality of matching priority parameters, and must indicate a commodity symbol, a price number, a buy or sell decision, and a quantity to be traded;

(B) generating pairing elements after validating each trading request of said packet and attaching a sequence number to each validated trading request;

(C) pairing the pairing elements in a matching table, said pairing step further comprising the steps of:

(C1) sending the pairing elements to the matching table according to the indicated commodity symbol and price number;

(C2) separating the pairing elements of the matching table into two sides, a buying side that contains pairing elements indicating a buy and a selling side that contains pairing elements indicating a sell; and (C3) summing submitted quantities of each side's pairing elements, comparing the two, and designating a side of a smaller sum as a short side, and a side of a larger sum as a long side;

(D) matching on each matching table pairing elements of a short side with the pairing elements of the long side, further comprising the steps of:

(D1) setting an initial matched quantity of each pairing element to be zero, and an initial unmatched quantity of each pairing element to be its submitted quantity;

(D2) selecting by a default method a pairing element from the short side and identifying the matching priority parameter indicated, if any;

(D3) selecting from the long side the pairing element of the earliest request submission time if the short side pairing element indicates so or does not indicate any matching priority parameter, or selecting by a default method a pairing element from the subset of the long side's pairing elements whose account profiles contain the matching priority parameter indicated by the short side's pairing element;

(D4) matching the two elements selected in steps (D2) and (D3) and setting new matched and unmatched results of the remote trader;

(D5) repeating steps (D3) and (D4) for a next pairing element of the long side until the short side pairing element's matching opportunity is exhausted;

(E) displaying effectuated multiple transaction prices and corresponding matched and unmatched quantities in tabular data or charts, wherein a price distribution of a commodity and distributions of several market indices can be directly observed by remote traders, wherein said steps (a) through (E) are preceded by a setup step of establishing an account profile database containing traders' account information, a transaction price database containing a plurality of predetermined price numbers, a commodity symbol database containing a plurality of the symbols of predetermined trading commodities, a matching priority parameter database containing a plurality of predetermined matching priority parameters, and a matrix of matching tables indexed by predetermined price numbers and commodity symbols, wherein validated trading requests of same submitted price and commodity symbol are to be gathered and matched.

2. The method of claim 1 wherein said steps are conducted continuously or at regular time intervals by said exchange server.

3. The method of claim 1 wherein said matching priority parameters include the request submission time, the submitted quantity, a settlement agency employed, a warehouse employed for delivery, or a distance between the remote trader and the exchange.

4. The method of claim 1 wherein said account profile database includes the remote trader's identification, contact information, and other account information that may be also indicated as matching priority parameters, such as settlement agency employed as well as warehouse employed for delivery.

5. The method of claim 1 wherein said packet of trading requests of step (A) is sent to the exchange server through a communications network by the remote trader.

6. The method of claim 5 wherein said communications network includes the World Wide Web, a Wireless Application Protocol network, the Internet, a Local Area Network, or a proprietary network.

7. The method of claim 1 wherein said step (A) for receiving the packet of trading requests from the remote trader further comprises the step of authenticating the remote traders' identification and password.

8. The method of claim 1 wherein said step (A) for receiving the packet of trading requests from the remote trader further comprises the step of assigning the receiving time as the request submission time of the packet of trading requests.

9. The method of claim 1 wherein said default method of (D2) includes a selection by request submission time or random drawing.

10. The method of claim 1 wherein said default method of (D3) includes a selection by request submission time or random drawing.

11. The method of claim 1 wherein said matched and unmatched results of step (D4) are stored in a matched result database and an unmatched result database, respectively.

12. The method of claim 1 wherein said tabular data or charts of step (E) convey the remote trader's own trading information including the content of his/her trading requests, matched results, and unmatched results.

13. The method of claim 1 wherein said tabular data or charts of step (E) convey also the latest trading information of a commodity that contains at least effectuated transaction prices, and corresponding total matched as well as unmatched quantities.

14. The method of claim 1 wherein said tabular data or charts of step (E) further conveys trading information of various groups of commodities and an aggregate market as represented by several market indices.

15. The method of claim 1 wherein said tabular data or charts of step (E) are sent to remote traders automatically or after receiving an inquiry of trading information.

16. A system to effectuate multiple transaction prices for a commodity, wherein transaction prices are always equal to common prices submitted by both buyers and sellers, comprising an exchange server coupled to a plurality of trader terminals over a communications network, the exchange server further comprising:
  means for generating a packet of trading requests for a remote trader to submit relevant trading information,
  means for receiving the packet of trading requests or an inquiry of trading information,
  means for generating pairing elements from said trading requests,
  means for generating a matrix of matching tables to match said pairing elements,
  means for determining a short side and a long side of one of the matching tables,
  means for matching one of the pairing elements of the short side with one of the pairing elements of the long side,
  means for calculating matched quantities and unmatched quantities,
  means for displaying trading information in tabular data or charts that enable direct observation of discrete price distributions,
  means for sending the trading information to remote traders, and
  means for storage of various software programs and databases.

17. The system of claim 16 wherein said communications network includes the World Wide Web, a Wireless Application Protocol network, the Internet, a Local Area Network, or a proprietary network.

18. The system of claim 16 wherein said means for receiving a packet of trading requests or an inquiry of trading information is further for authenticating an identification of the remote trader and assigning a receiving time as a request submission time of the packet of the trading requests.

19. The system of claim 16 wherein said packet of trading requests comprises as least one trading request on which the remote trader can optionally indicate a plurality of matching priority parameters, and must indicate at least a commodity symbol, a transaction price, a decision to buy or sell, and a quantity to be traded.

20. The system of claim 19 wherein said matching priority parameters include a request submission time, the trading quantity, a settlement agency employed, a warehouse for delivery, or the distance between the remote trader and the exchange server.

21. The system of claim 16 wherein said means for generating pairing elements from trading requests is further for validating each trading request and attaching it with a sequence number.

22. The system of claim 16 wherein said means for determining the short side and the long side of a matching table further comprises means for comparing the sum of all pairing elements indicating a buy decision with the sum of all pairing elements indicating a sell decision.

23. The system of claim 16 wherein said means for matching one of the pairing elements of the short side with one of the pairing elements of the long side further comprises:
  a first selector for selecting said pairing element of the short side based on request submission time or random drawing,
  a second selector for selecting said pairing element of the long side based on request submission time, when said short side pairing element indicates so or does not indicate any matching priority parameter, and,
  a third selector for selecting said pairing element of the long side based on request submission time or random drawing when said short side pairing element indicates at least a matching priority parameter, the third selector further comprising:
    a finding device for finding a subset of the long side pairing elements whose account profiles contain the matching priority parameter indicated in said short side pairing element.

24. The system of claim 16 wherein said means for calculating matched quantities and unmatched quantities further comprises a determining device for determining if a pairing element's matching opportunity is exhausted.

25. The system of claim 24 wherein said pairing element's matching opportunity is exhausted when its unmatched quantity reaches zero or falls below a minimum lot size.

26. The system of claim 16 wherein said tabular data or charts convey a remote trader's own trading information including a content of his/her trading requests, matched results, and unmatched results; trading information of a commodity including effectuated transaction prices, corresponding total said matched as well as unmatched quantities; and trading information of various groups of commodities as well as an aggregate market as represented by several market indices.

27. The system of claim 16 wherein said trading information is sent to remote traders automatically or after receiving an inquiry.

28. The system of claim 16 wherein said data bases comprise an account profile database containing traders' account information, a transaction price database containing a plurality of predetermined price numbers, a commodity symbol database containing a plurality of the symbols of predetermined trading commodities, a matching priority parameter database containing a plurality of predetermined matching priority parameters, a matched result database, and an unmatched result database.

* * * * *